United States Patent [19]

Shimizu

[11] Patent Number: 4,877,986

[45] Date of Patent: Oct. 31, 1989

[54] ROTOR OF MAGNETIC GENERATOR

[75] Inventor: Yuzuru Shimizu, Himeji, Japan

[73] Assignee: Mitsubishi Denki Kabushiki Kaisha, Tokyo, Japan

[21] Appl. No.: 196,625

[22] Filed: May 19, 1988

[30] Foreign Application Priority Data

May 19, 1988 [JP] Japan .............................. 62-122020

[51] Int. Cl.⁴ ...................... H02K 21/22; H02K 5/06
[52] U.S. Cl. .................................... 310/153; 29/598; 310/156; 310/42; 310/74
[58] Field of Search ...................... 29/598; 310/42, 43, 310/45, 153, 74, 156, 67 R, 261; 74/572; 123/149 R, 149 D

[56] References Cited

U.S. PATENT DOCUMENTS 4,433,473  2/1984  Benedetti ........................... 310/153
4,625,392  12/1986  Stokes ................................ 310/42
4,757,603  7/1988  Stokes ............................... 310/156

FOREIGN PATENT DOCUMENTS 59-69681  5/1984  Japan ................................. 310/153

Primary Examiner—Patrick R. Salce
Assistant Examiner—D. L. Rebsch
Attorney, Agent, or Firm—Lowe, Price, Leblanc, Becker & Shur

[57] ABSTRACT

A rotor of a magnetic generator has a plurality of permanent magnets (13) disposed on an inner surface of a peripheral wall (11a) of a bowl-shaped flywheel (11). The permanent magnets (13) are held in place by a magnet-holding cylinder (14) having plural outward protrusions (14c) formed in a radial direction at a first open end and an outward flange (14e) formed on a second open end thereof. Resin (15) is provided to fill empty spaces of this assembly so that the magnets (13), the magnet-holding cylinder (14) and the flywheel (11) are made of an integral piece thereby.

6 Claims, 7 Drawing Sheets

ROTOR OF MAGNETIC GENERATOR

FIELD OF THE INVENTION

The present invention relates to a rotor of a magnetic generator, and particularly to an improved magnet holding cylinder for guiding permanent magnets disposed on a flywheel type rotor of a magnetic generator.

BACKGROUND OF THE RELATED ART

A conventional flywheel type rotor of a magnetic generator is illustrated in FIG. 8, FIG. 9 and FIG. 10. A rotor of a magnetic generator is generally connected to a rotary shaft such as a crankshaft or the like of an engine (not shown in the figures). A magnetic generator, an ignition coil, capacitor and the like elements are disposed on an inside space of the rotor, and electric power from the magnetic generator is used to provide ignition for the engine.

In FIGS. 8–10, a rotor 10 comprises a flywheel 1, a boss 2, a plurality of permanent magnets 3, and a magnet-holding cylinder 5. The flywheel 1 is bowl-shaped and has a peripheral wall part 1a and a disc part 1b. The boss 2 is fixed on the center of the disc part 1b of flywheel 1 and is connected to a rotary shaft of an engine. The permanent magnets 3 are circularly disposed on an inner surface of the peripheral wall 1a of flywheel 1. Plural protrusion parts (or offset parts) 4 for positioning the permanent magnets 3 in an axial direction of the rotor 10 are formed on the peripheral wall 1a of the flywheel 1 by partially extruding the peripheral wall 1a at positions close to where the permanent magnets 3 are to be disposed.

Magnet holding cylinder 5 has an outward flange 5a, as best seen in FIG. 11, formed of an iron plate or a stainless steel sheet. An outer surface of a cylindrical part 5b of the magnetholding cylinder 5 contacts inner surfaces 3a of the permanent magnets 3 so as to prevent them from moving in the radial direction of the rotor 10. Outward flange part 5a contacts surfaces 3b of the permanent magnets 3 facing to the open end 1c of the flywheel 1 for positioning or fixing the permanent magnets 3 in the axial direction of the rotor 10, to prevent their motion in the axial direction.

Spaces formed between the permanent magnets 3, the flywheel 1 and the magnet-holding cylinder 5 are filled by resin molded member 6 for integrating them into one piece. Protrusions 7 for preventing disconnection of the resin molded member 6 are formed on the peripheral wall 1a of the flywheel 1 by partially pressing thereof at positions between each of the permanent magnets 3.

As mentioned above, the permanent magnets 3, which are to be disposed on the peripheral wall 1a of the flywheel 1, are positioned in the axial direction of the rotor 10 by contacting with the plural protrusion parts 4 in the conventional rotor of the magnetic generator. The protrusion parts 4, however, needs large scale arrangements for being pressed. As a result manufacture of such a rotor 10 has the disadvantages of high cost and low productivity.

SUMMARY OF THE INVENTION

The principal object of the present invention is to provide an improved magnetic generator having high productivity, especially a rotor of the magnetic generator free of any protrusion formed on a peripheral wall of a flywheel for positioning permanent magnets parallel to axis of the rotor.

A rotor of a magnetic generator, in accordance with the present invention, comprises:
 a bowl-shaped flywheel having a disc-shaped bottom part and a peripheral wall part;
 a plurality of magnets disposed on an inner surface of the peripheral wall of the flywheel separated at intervals of a predetermined angle;
 a cylindrical magnet-holding cylinder having an outward flange formed on a first open end and plural outward intervals of another predetermined angle, whereby the plurality of the magnets is respectively positioned in the axial direction of the rotor; and
 a resin molded member that fills in spaces formed between the flywheel, the magnets and the magnet-holding cylinder for making the flywheel, the magnets and the magnet-holding cylinder in one piece.

By the above-mentioned constitution, during manufacture the press work conventionally required on the peripheral wall of the flywheel 1, for forming inner protrusion parts 4 for positioning the permanent magnets 3 in the conventional rotor of the magnetic generator, can be omitted. As a result, manufacturing productivity is improved and the cost for producing the rotor is reduced.

DESCRIPTION OF THE PREFERRED EMBODIMENT

A preferred embodiment of a rotor of a magnetic generator in accordance with the present invention is described, as follows, with reference to FIGS. 1–FIG. 4.

Figure 1:
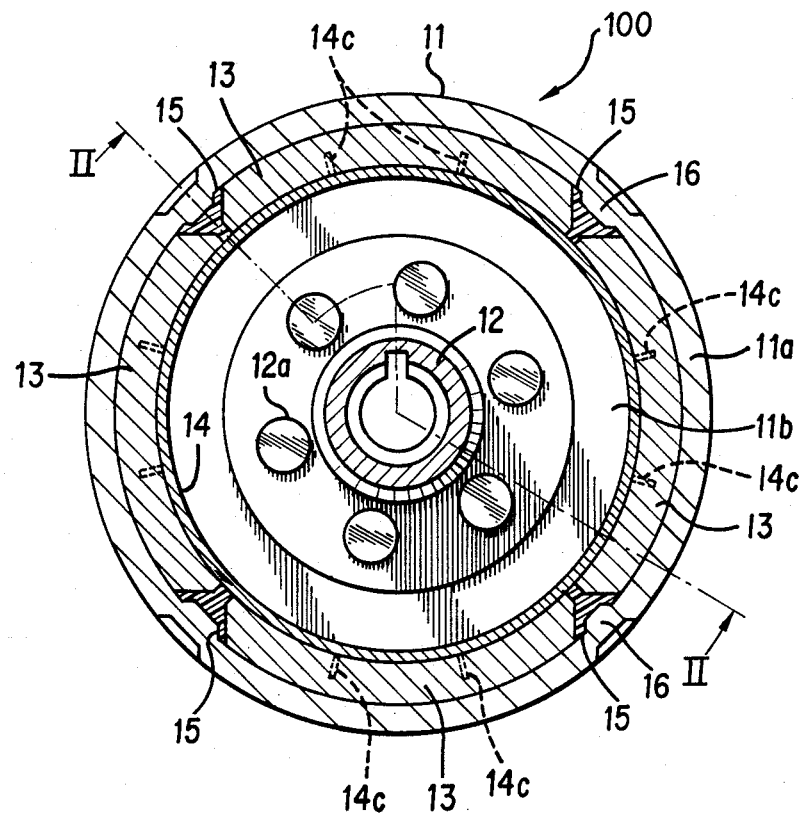
FIG. 1 is a cross-sectional plan view showing a preferred embodiment of a rotor of a magnetic generator in accordance with the present invention.
Figure 2:
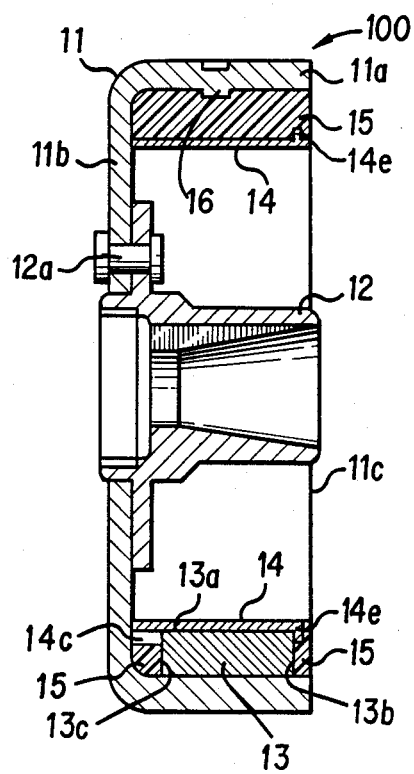
FIG. 2 is a cross-sectional side view showing II—II section of the rotor shown in FIG. 1.

In FIG. 1 and FIG. 2, a rotor 100 of a magnetic generator comprises: a bowl-shaped flywheel 11; a boss 12 which is to be connected to a rotary shaft such as a crankshaft of an engine (not shown in the figures); plural permanent magnets 13 (four shown); and a magnet-holding cylinder 14 for positioning the permanent magnets 13 on the flywheel 11. The flywheel 11 has a peripheral wall 11a and a disc part 11b, and the peripheral wall 11a is formed on an outer peripheral line of the disc 11b. The boss 12 is fixed on the center of the disc part 11b of the flywheel by rivets 12a or the like. The permanent magnets 13 are circularly disposed on an inner surface of the peripheral wall 11a of the flywheel 11 at intervals of a predetermined angle, for example 90°, and positioned thereto by the magnet-holding cylinder 14.

Figure 3:
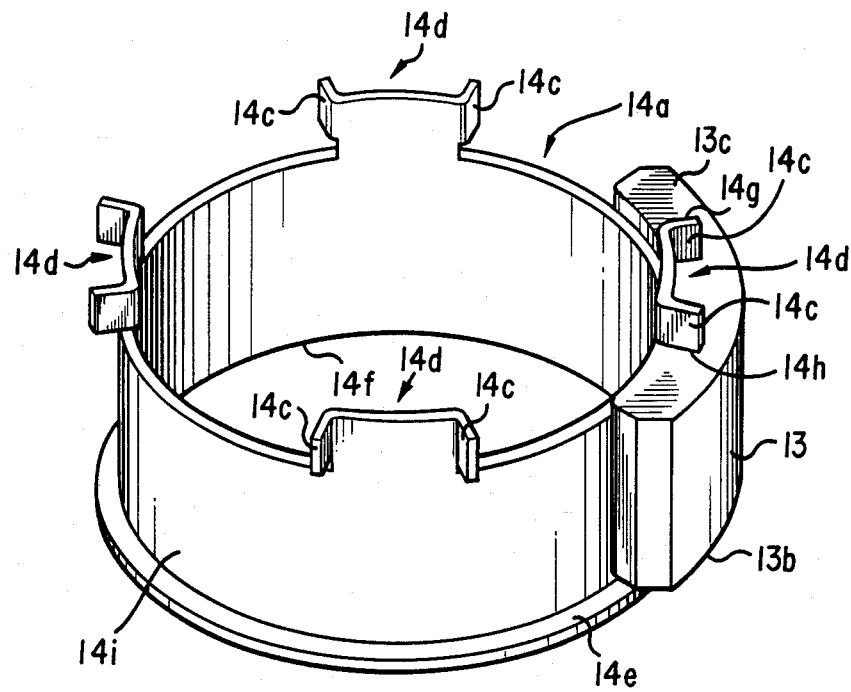
FIG. 3 is a perspective view showing an embodiment of a magnet-holding cylinder 14 of the rotor shown in FIG. 2.

The magnet holding cylinder 14 is substantially cylindricalshaped as shown in FIG. 3, and has an outward flange 14e formed on an open end 14f and plural channel-bar-shaped teeth 14d formed on the other open end 14a at intervals of predetermined angle such as 45° or 90° and the like. The teeth 14d have respectively two outward protrusions 14c protruded in radial direction of the magnet holding cylinder 14.

For forming the teeth 14d, (1) first plural cutting lines parallel to the axial direction of the magnet-holding cylinder are cut at a peripheral part of a cylinder; (2) second plural cutting lines in a circumferential direction on the periphery are then cut to make inverted T-shaped slots together with the first cutting lines; and (3) rectangle shaped pieces thus formed by the inverted T-shaped slots are respectively bent outwards in radial direction of the cylinder, thereby making the protrusions 14c. By contrast, the other peripheral part of the cylinder 14i is fully bent outwards in a radial direction so as to form the flange 14e. Figures illustrating these steps of the above-mentioned processes are omitted because they are known.

The permanent magnets 13, which are to be disposed on the inner surface of the peripheral wall 11a of the flywheel 11, are mounted on the magnet-holding cylinder 14 by contacting end surfaces 13b and 13c respectively with the flange 14e and inner end surfaces 14h of the protrusions 14c, respectively. The outer end faces 14g of the protrusions contact with the disc part 11b of the flywheel 11 when the magnet holding cylinder 14 is disposed in the flywheel 11 as shown in FIG. 2 and positioning of the magnets 13 parallel to the axial direction of the rotor 100 is defined by the protrusions 14c and the flange 14e. Positioning of the magnets 13 on circumference of the rotor 100 is substantially defined by using a jig or the like of known kins (not shown because obvious). Positioning of the magnets 13 in the radial direction of the rotor 100 is defined by the contacting an inner surface 13a of the magnets 13 to the cylindrical part 14i of the magnet-holding cylinder 14.

After positioning the magnets 13 on the flywheel 11, the spaces formed between the peripheral wall 11a of the flywheel 11, the magnet-holding cylinder 14 and the magnets 13 are filled by resin 15. As best seen in FIG. 2, the resin 13 also spreads over magnets 13 and the flange 14e of the magnet-holding cylinder 14 up to level of the open end 11c of the peripheral wall 11a of the flywheel 11, because the height of the peripheral wall 11a is higher than that of the magnet-holding cylinder 14. The resin molded part 15, that fills in the spaces by the above-mentioned processes, serves for fixing the magnets 13 and the magnet-holding cylinder 14 in place. At an intermediate position on the inner face of the peripheral wall 11a of the flywheel 11, plural protrusions 16 are formed at positions between each magnets 13 for engagement of the resin molded part 15 to the flywheel 11.

Figure 4:
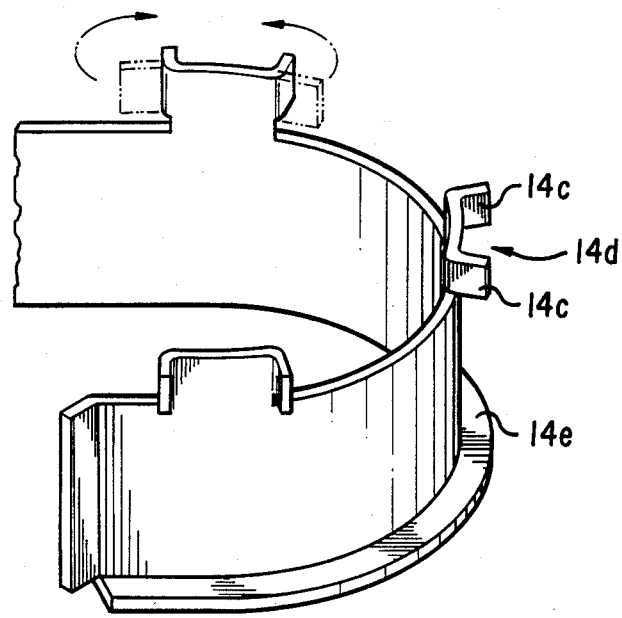
FIG. 4 is a perspective view showing another embodiment of a magnet-holding cylinder 14 shown in FIG. 3 at an intermediate stage in process of producing the same.

The magnet-holding cylinder 14 shown in FIG. 3 is produced by drawing from a disc-shaped iron sheet or stainless steel sheet, and waste of the material is considerable and the cost of the waste material becomes significant. Furthermore, the magnet-holding cylinder 14 produced by drawing generally has the disadvantage of acquiring poor magnetic characteristics due to magnetostriction. Therefore, another preferred embodiment of the magnet-holding cylinder 14, as shown in FIG. 4, is made by omitting such drawing. As best understood from FIG. 4, the magnet-holding cylinder 14 is produced by cylindrical bending roll of a ribbon-shaped metal plate such as iron plate, stainless steel plate or the like. As a result of the relatively gentle bending work involved in this, the production yield of material for producing the magnet holding cylinder 14 is correspondingly larger and the magnetic characteristic thereof is much improved because of omission of the magnetostriction otherwise caused by the drawing step in its manufacture.

Another preferred embodiment of a rotor of a magnetic generator in accordance with the present invention will now be described with reference to FIG. 5–FIG. 7. Corresponding parts and elements shown in FIGS. 1–FIG. 4 are designated by the same numerals.

Figure 5:
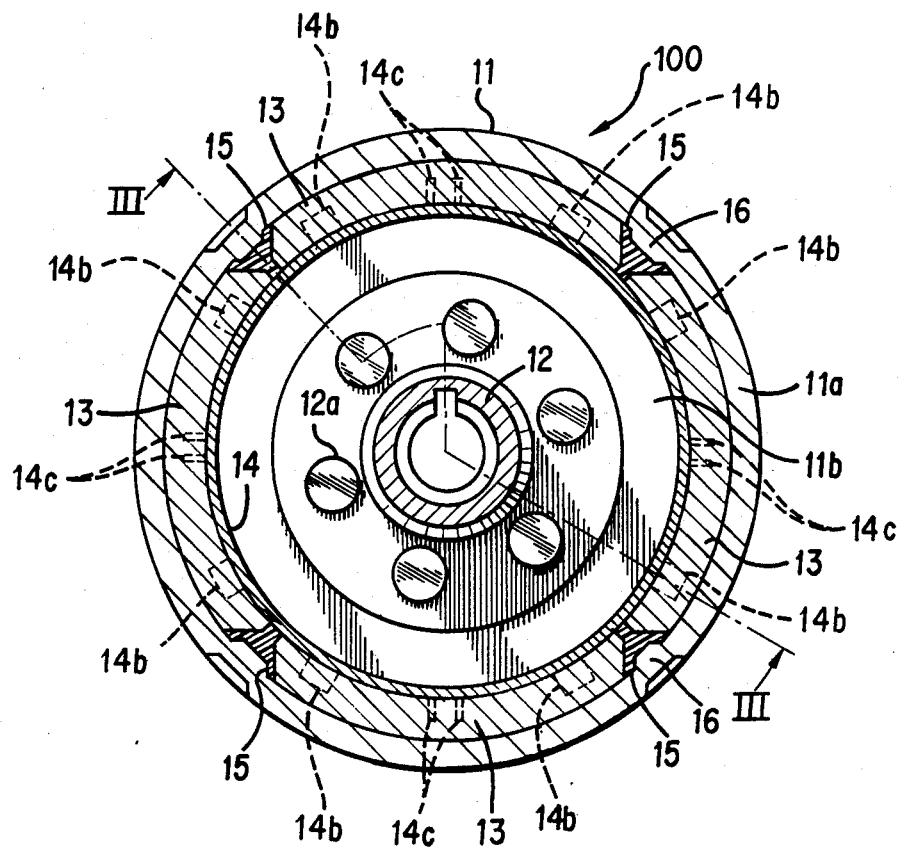
FIG. 5 is a cross-sectional plan view showing another preferred embodiment of a rotor of a magnetic generator in accordance with the present invention.
Figure 6:
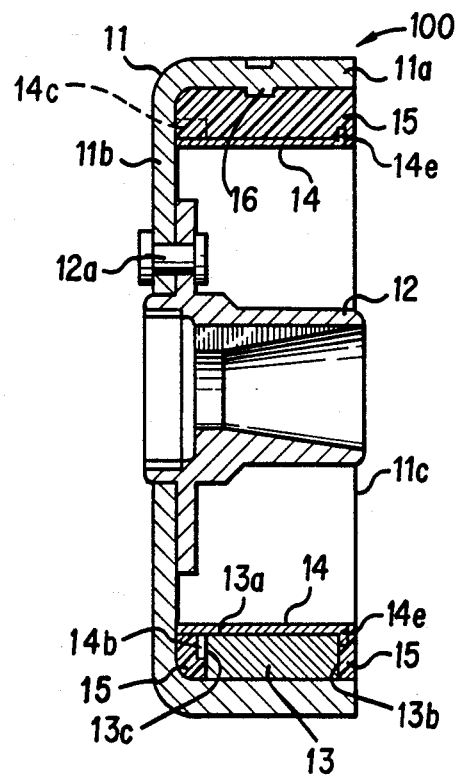
FIG. 6 is a cross-sectional side view showing III—III section of the rotor shown in FIG. 5.
Figure 7:
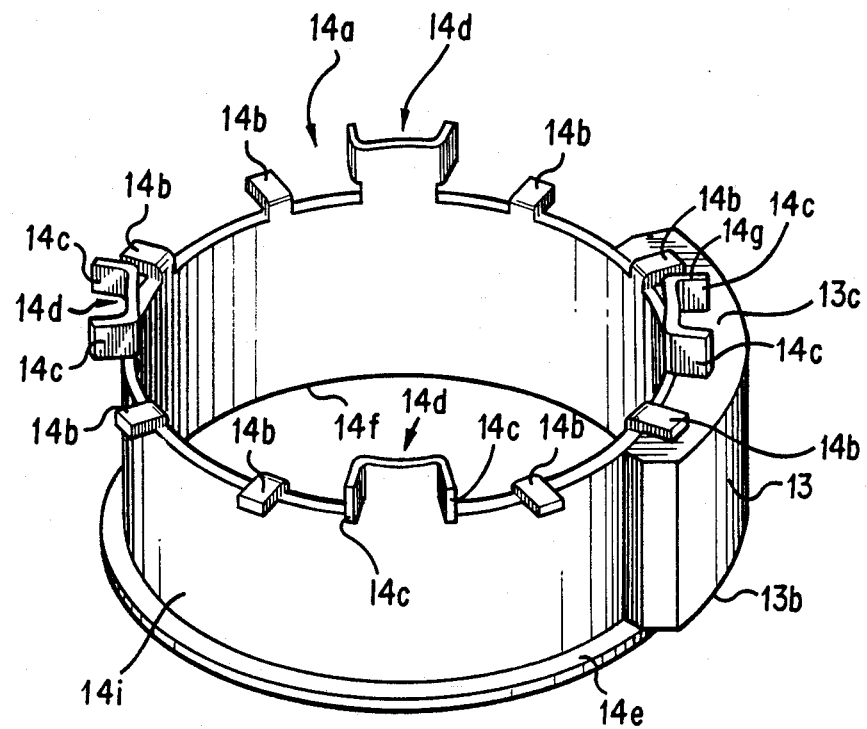
FIG. 7 is a perspective view showing a magnet-holding cylinder 14 of the rotor shown in FIG. 6.
Figure 8:
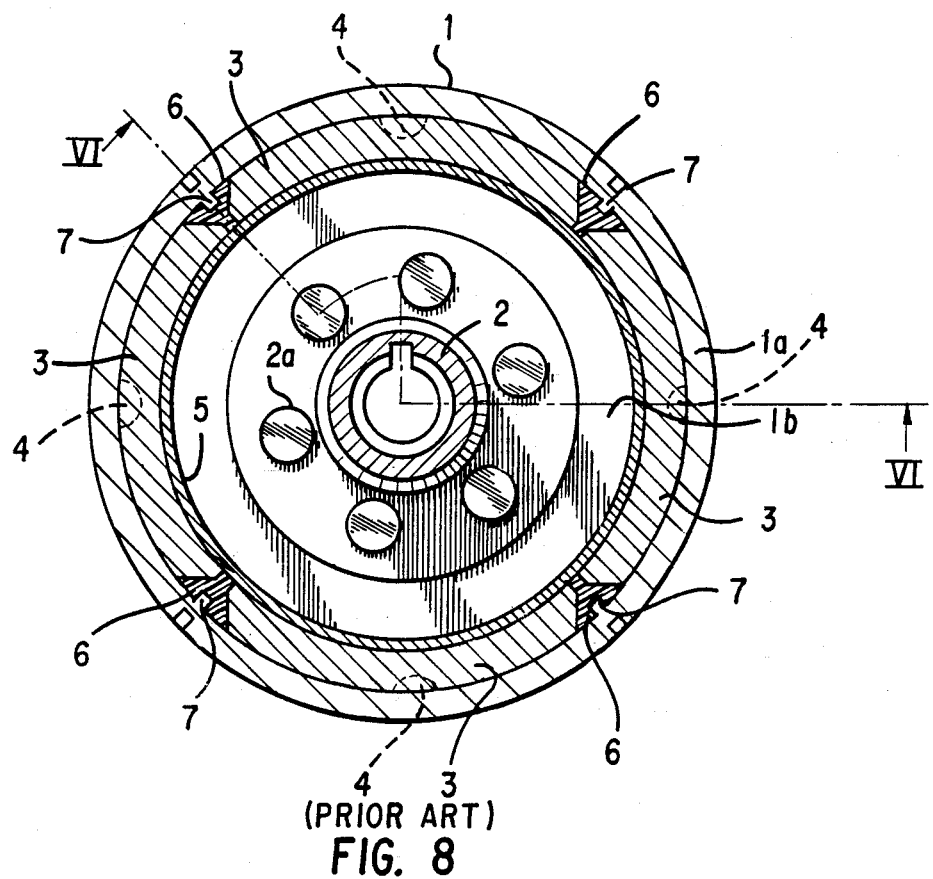
FIG. 8 is a plan view showing a conventional rotor of a magnetic generator.
Figure 9:
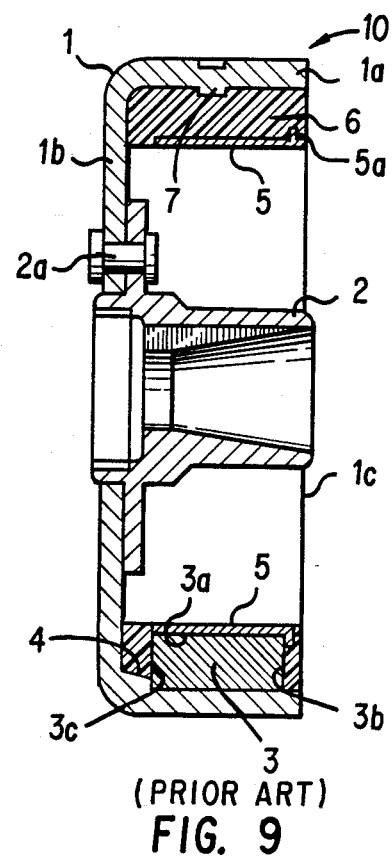
FIG. 9 is a cross-sectional side view showing VI—VI section of the conventional rotor shown in FIG. 8.
Figure 10:
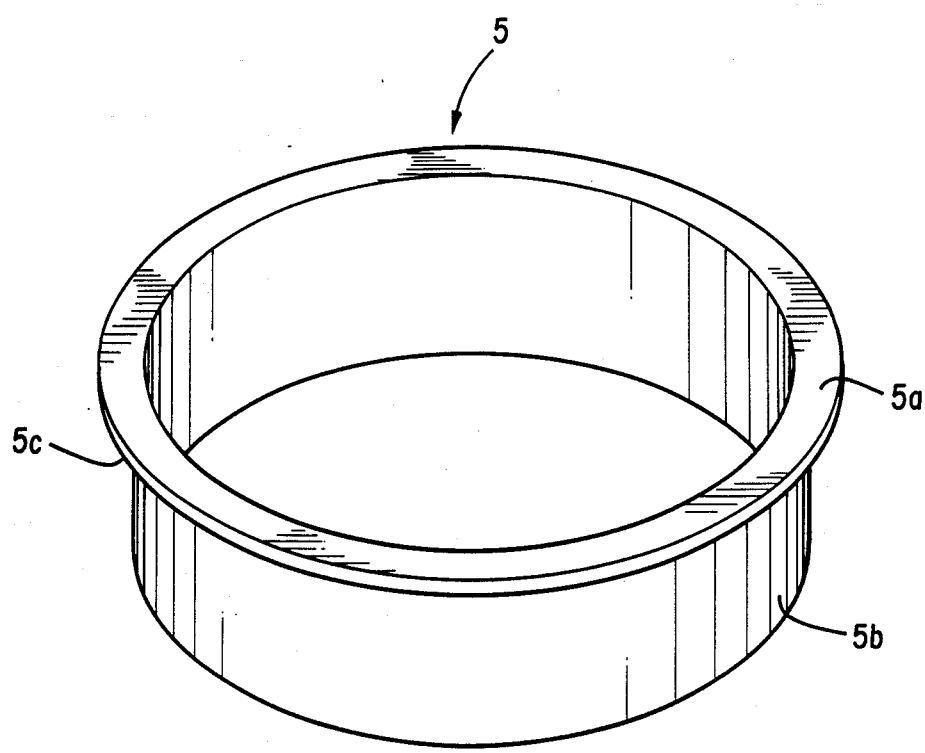
FIG. 10 is a perspective view showing a conventional magnet holding cylinder 5 of the rotor shown in FIG. 9

In FIG. 5 and FIG. 6, the magnets 13 are positioned in directions parallel to axis of the rotor 100 by auxiliary protrusions 14b and the flange 14e of the magnet holding cylinder 14. Namely, the magnets 13 are mounted on the magnet-holding cylinder, by being held between the flange 14e and the teeth 14d and the auxiliary protrusions 14b, as shown in FIG. 7. The auxiliary protrusions 14b are outwardly protruded in the radial direction of the magnet-holding cylinder 14. In mass-production, it is convenient to form many auxiliary protrusions 14b for positioning the magnets, so that accurate positioning of the magnet-holding cylinder 14 in the circumferential direction, during its manufacture, can be omitted. Since the teeth need a given length of edge on the periphery of the magnet holding cylinder 14, it is difficult to form many teeth 14d on the peripheral part of the magnet holding cylinder 14, and therefore, auxiliary protrusions 14b each having a simple shape are effective for positioning of the magnets 13.

What is claimed is:

1. A rotor of a magnetic generator, comprising:
   a bowl-shaped flywheel having a disc-shaped bottom part and a cylindrical peripheral wall part of a first inside diameter;
   a plurality of magnets, disposed on an inner surface of said peripheral wall of said flywheel at intervals of a predetermined angle;
   a magnet-holding cylinder having an inner cylindrical surface of a predetermined second diameter smaller than said first inside diameter having an outward flange formed on a first open end and a plurality of outward protrusions circularly formed on a second open end at intervals of another predetermined angle, said plurality of magnets being respectively positioned thereby to be parallel to the axis of said magnet-holding cylinder; and
   a resin molded member, that fills in spaces formed between said flywheel, said magnets and said magnet-holding cylinder for making said flywheel, said magnets and said magnet-holding cylinder in one piece so as to leave an inside open space contiguous with said inner cylindrical surface.

2. A rotor of a magnetic generator in accordance with claim 1, wherein:
   said magnet-holding cylinder comprises a circularly-shaped thin iron sheet.

3. A rotor of a magnetic generator, comprising:

a bowl-shaped flywheel having a disc-shaped bottom part and a peripheral wall part;

a plurality of magnets disposed on an inner surface of said peripheral wall of said flywheel at intervals of a first predetermined angle;

a magnet-holding cylinder having a first outward flange formed on a first open end, a plurality of first outward protrusions circularly formed on a second open end at intervals of a second predetermined angle for positioning at intervals of a second predetermined angle for positioning said magnet-holding cylinder and a plurality second outward protrusions circularly formed and disposed between said first and second open ends at intervals of a third predetermined angle for positioning said magnets parallel to the axis of said rotor; and a resin molded member, formed to fill in spaces formed between said flywheel, said magnets and said magnet-holding cylinder for forming said flywheel, said magnets and said magnet-holding cylinder into one piece.

4. A rotor of a magnetic generator in accordance with claim 3, wherein:

said cylindrical magnet-holding cylinder comprises a circularly-shaped thin iron sheet formed to provide said first and second protrusions.

5. A rotor of a magnetic generator in accordance with claim 1, wherein:

said cylindrical magnet-holding cylinder comprises a circularly-shaped stainless steel sheet.

6. A rotor of a magnetic generator in accordance with claim 3, wherein:

said cylindrical magnet-holding cylinder comprises a circularly-shaped stainless steel sheet.

* * * * *

UNITED STATES PATENT AND TRADEMARK OFFICE
CERTIFICATE OF CORRECTION

PATENT NO. : 4,877,986
DATED : October 31, 1989
INVENTOR(S) : Yuzuru SHIMIZU

It is certified that error appears in the above-identified patent and that said Letters Patent is hereby corrected as shown below:

On the title page:

Under [30] Foreign Application Priority Data, please change "May 19, 1988" to --May 19, 1987--.

Signed and Sealed this

Twenty-sixth Day of March, 1991

Attest:

HARRY F. MANBECK, JR.

*Attesting Officer*  *Commissioner of Patents and Trademarks*